United States Patent [19]
Burayez et al.

[11] Patent Number: 5,506,391
[45] Date of Patent: Apr. 9, 1996

[54] LIQUID HEATER USING ELECTRICAL OSCILLATIONS

[75] Inventors: Amar K. Burayez, Grenada Hills; Nathan H. Noe, Thousand Oaks, both of Calif.

[73] Assignee: Lexington Environmental Technologies, Inc., Mesa, Ariz.

[21] Appl. No.: 89,690

[22] Filed: Jul. 12, 1993

[51] Int. Cl.⁶ .................................................... H05B 6/50
[52] U.S. Cl. ...................... 219/772; 219/779; 219/687; 219/629; 219/667; 166/60
[58] Field of Search .................. 219/772, 629, 219/628, 687, 688, 667, 710, 779, 497, 494; 166/60, 248

[56] References Cited

U.S. PATENT DOCUMENTS

| | | |
|---|---|---|
| 1,386,487 | 8/1921 | Forssblad . |
| 1,403,102 | 1/1922 | Perkins . |
| 1,513,250 | 10/1924 | Kaelin . |
| 1,522,214 | 1/1925 | Unland . |
| 1,650,632 | 11/1927 | Kowallik . |
| 1,696,828 | 12/1928 | Price-Williams . |
| 1,999,962 | 4/1935 | Des Rosiers .................... 219/40 |
| 2,453,776 | 11/1948 | Beath et al. .................... 219/40 |
| 2,508,365 | 5/1950 | Bierwirth ....................... 219/772 |
| 3,187,160 | 6/1965 | Williams ........................ 219/286 |
| 3,299,252 | 1/1967 | Meek ............................. 219/293 |
| 3,513,291 | 5/1970 | Mamoulides et al. .......... 219/285 |
| 3,641,302 | 2/1972 | Sargeant ....................... 219/772 |
| 3,946,197 | 3/1976 | Williams ........................ 219/290 |
| 3,983,359 | 9/1976 | Walker et al. ................. 219/284 |
| 4,343,987 | 8/1982 | Schimbke et al. ............. 219/287 |
| 4,358,652 | 11/1982 | Kaarup ......................... 219/688 |
| 4,417,116 | 11/1983 | Black ............................ 219/688 |
| 4,429,203 | 1/1984 | Ramer .......................... 219/688 |
| 4,560,849 | 12/1985 | Migliori et al. ................ 219/667 |
| 4,814,567 | 3/1989 | De Angelis et al. ........... 219/772 |
| 5,023,432 | 6/1991 | Boykin et al. ................. 219/497 |

*Primary Examiner*—Philip H. Leung
*Attorney, Agent, or Firm*—Cislo & Thomas

[57] ABSTRACT

A diathermal water heater for the rapid and controlled heating of water and like fluids. A diathermal heating chamber uses electrical oscillations to heat liquids flowing through it. By means of feedback circuitry, the electrical oscillations are controlled to provide liquids at a constant temperature. Household and industrial quantities of hot water, wet steam and dry steam may be generated by the water heater. The heater itself is compact and can be used to provide one pipe plumbing to provide water at controlled heated temperatures.

6 Claims, 3 Drawing Sheets

5,506,391

LIQUID HEATER USING ELECTRICAL OSCILLATIONS

BACKGROUND OF THE INVENTION

1. Field of the Invention

This invention relates to electric water heaters, and more particularly to diathermal water heaters that use electrical oscillations to rapidly heat water and like fluids to high temperatures.

2. Description of the Related Art Including Information Disclosed Under 37 C.F.R. §§ 1.97–1.98

Domestic and industrial water heating provides several useful advantages over the use of water at room temperature. With increased temperature, the cleaning and soluble capacity of water greatly increases and enhances the uses to which such heated water is put. In the home, hot water is used in cooking, bathing and cleaning. In the factory, hot water, wet steam and dry steam all have their appropriate uses under the specific conditions arising in industry.

The controlled heating of water has progressed significantly since the times water was boiled in a metal container over an open fire. In the home, electric and/or gas heaters are used to bring thirty to fifty gallons of water to high temperatures. Once heated, the water tank is maintained at the desired temperature by thermostatic control. Heat is dissipated from such heaters by radiation and by the introduction of cool water into the tank to replenish the hot water used in the home. Such electric water heaters generally use resistive elements while such gas heaters generally use burning gas to generate heat which is conducted from a firebox to the water tank.

Industrially, large boilers may also be heated in generally the same manner as is accomplished in the home. Large tanks of water are heated in boilers to provide hot water. In addition to electricity and gas, coal, oil, or other combustible substances may be used to provide heat in a firebox that is conducted to the water in the boiler.

An alternative method exists by which water may be heated. In the previously described methods, heat was provided in a form that was then conducted to the water in the tank or boiler. It is possible to directly heat water by the direct application of an electric current that runs through the water to be heated. In running electric current through the water, the water acts as a resistive element that is subject to resistive heating. The water through which the electric current is run is resistively-heated and any water surrounding such resistively-heated water is also heated by radiation and conduction from the resistively-heated water.

Drawbacks exist in these prior methods of heating water. Primarily, the electric, gas and related water heaters used in the home and factory must continually maintain the temperature of the water in the tank at a pre-selected level and in an amount that can quickly supply the demands for hot water. In maintaining a substantial or large reservoir of hot water, structures must be physically and mechanically provided that can occupy a great deal of space and that require significant expense to construct and maintain. Furthermore, beyond the plumbing necessary for delivery of cold water, an entirely separate and parallel plumbing system must be provided to deliver hot water from the reservoir to the place where it is required or desired. Beyond the additional structures required for hot water plumbing, radiative losses of heat from the hot water occurs as it is delivered from the reservoir to the point of demand. These radiative losses decrease the effectiveness of the hot water as it becomes cooler the farther it travels through its pipes. Insulating hot water pipes requires additional construction and maintenance.

Additionally, in attaining and maintaining the desired temperature of water in the hot water reservoir, energy must be expended to first attain the desired reservoir temperature and then additional energy must also be expended to maintain the water at that temperature. Although no demands may be placed that deplete the reservoir of heated water, the reservoir will always lose some heat which must be replenished by the addition of more energy in the form of heat.

A further drawback to heated reservoir systems occurs with the time required to heat a recently filled or replenished reservoir. Water has a significant heat capacity allowing it to absorb a significant amount of heat before its temperature rises. When a reservoir's temperature drops significantly below the preset temperature, the time it takes the energy source to heat the water back up to the desired temperature depends upon the heat source, the temperature of the water, and the size of the reservoir. As any person caught in the middle of taking a shower can confirm, the time it takes for a hot water heater to re-attain the selected temperature is usually too long and is rarely welcomed.

Drawbacks in those heaters that run current directly through the water to be heated also exist. Whenever water and electricity are mixed, stringent safeguards need to be provided in order to ensure that the electricity does not escape from its intended confines. Property damage and personal injury can arise should a short circuit occur or should the electricity escape from its intended paths. Furthermore, to control the performance of electrical current water heaters, the depth to which the electrodes are immersed in water has commonly been the preferred method of controlling the transmission of electricity through the water. This is a mechanical process with the inherent drawback that mechanical processes are generally much slower that electrical or electronic ones. A malfunction in the heater could quickly go awry causing damage or injury before the electrodes used to conduct the electricity through the water could be removed from the water.

It can be seen that there are significant advantages to providing a water heater that overcomes these drawback in previous water heaters. Further advantages may also be realized by providing a water heater that is sufficiently compact, energetic and efficient so that it can be located immediately adjacent to the point at which hot water, wet steam or dry steam may be required.

SUMMARY OF THE INVENTION

The present invention is a point-of-demand water heater that is compact yet capable of delivering hot water quickly and safely.

Using the principles of diathermy, water is passed through a heating chamber where it is heated in a controlled manner before flowing out of the chamber. The chamber has an inner stainless steel tube about which the water flows. Surrounding both the inner stainless steel tube and the flowing water is an outer stainless steel tube. The two concentric stainless steel tubes are used as electrodes that are connected to a source of electrical oscillations. As the water passes between the two stainless steel tubes, these electrical oscillations are impressed upon the flowing water so that the water may be heated. Dissolved minerals and other impurities in the water are susceptible to these electrical oscillations and cause the water to heat rapidly so that the water is hot when it emerges from the heating chamber.

In order to control the temperature of the water emerging from the heating chamber, a control circuit is provided. The control circuit is the source of the electrical oscillations used to heat the water. Power supplied to the control circuit is modulated by a power supply and an oscillator circuit. In response to a thermal sensor associated with the heating chamber, the oscillator supplies the power supply with the frequency at which electrical oscillations are to be supplied to the heating chamber. By means of the thermal sensor-oscillator feedback mechanism, the temperature of the water leaving the heating chamber is controlled.

Additional elements are incorporated into the control circuit to improve the performance and control of the heating chamber. Several other uses for the diathermal water heater of the present invention are also realized when it is used in the reclamation of water from an otherwise contaminated liquid and when it is used to supply steam for injection into oil wells for enhanced oil recover.

OBJECTS OF THE INVENTION

It is an object of the present invention to provide a diathermal water heater.

It is an object of the present invention to provide a water heater that may be conveniently used at the source of demand for hot water.

It is an object of the present invention to provide a water heater that rapidly provides hot water from water of ambient temperature.

It is an object of the present invention to provide a water heater that is energy efficient.

It is an object of the present invention to provide a water heater that requires minimal additional plumbing for the delivery of hot water.

It is an object of the present invention to provide a water heater that is compact and that fits within a confined space according to anticipated hot water demands.

It is an object of the present invention to provide control circuity for a diathermal water heater.

It is an object of the present invention to provide control circuitry for a diathermal water heater that can be adjusted for the immediate use or for different applications.

These and other objects and advantages of the present invention will be apparent from a review of the following specification and accompanying drawings.

DESCRIPTION OF THE PREFERRED EMBODIMENT(S)

Figure 1:
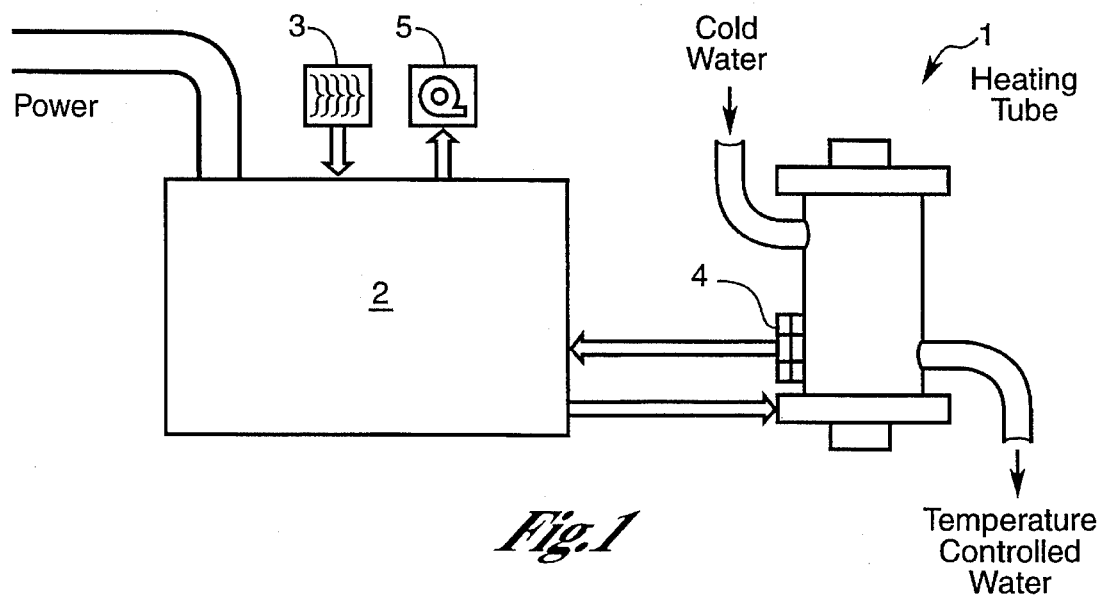
FIG. 1 is a plan view of a general schematic of the present invention showing the heating tube and control circuitry.
Figure 2:
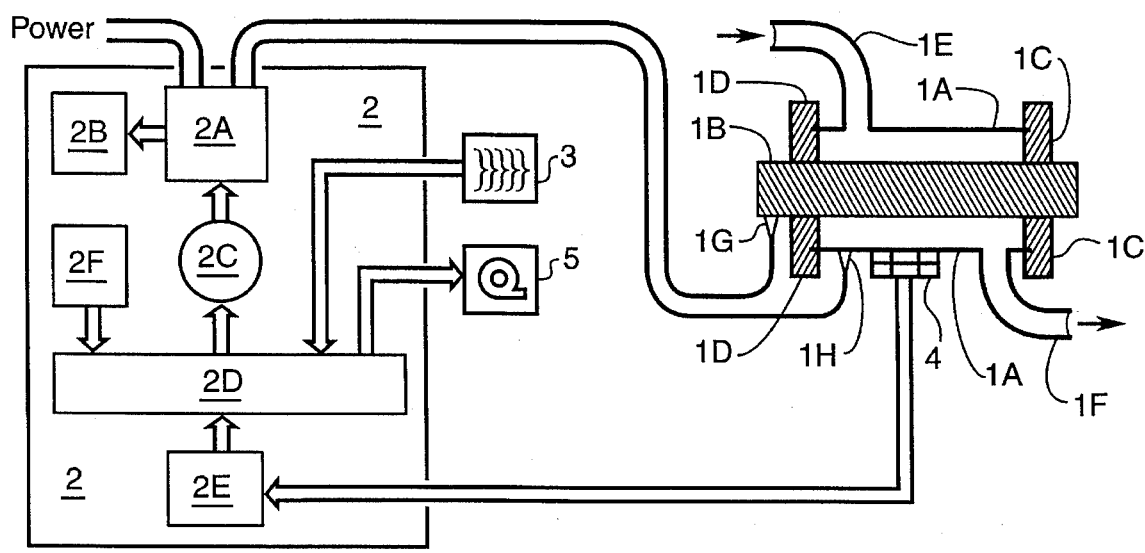
FIG. 2 is a plan view of a more detailed schematic of the present invention shown generally in FIG. 1.
Figure 5:
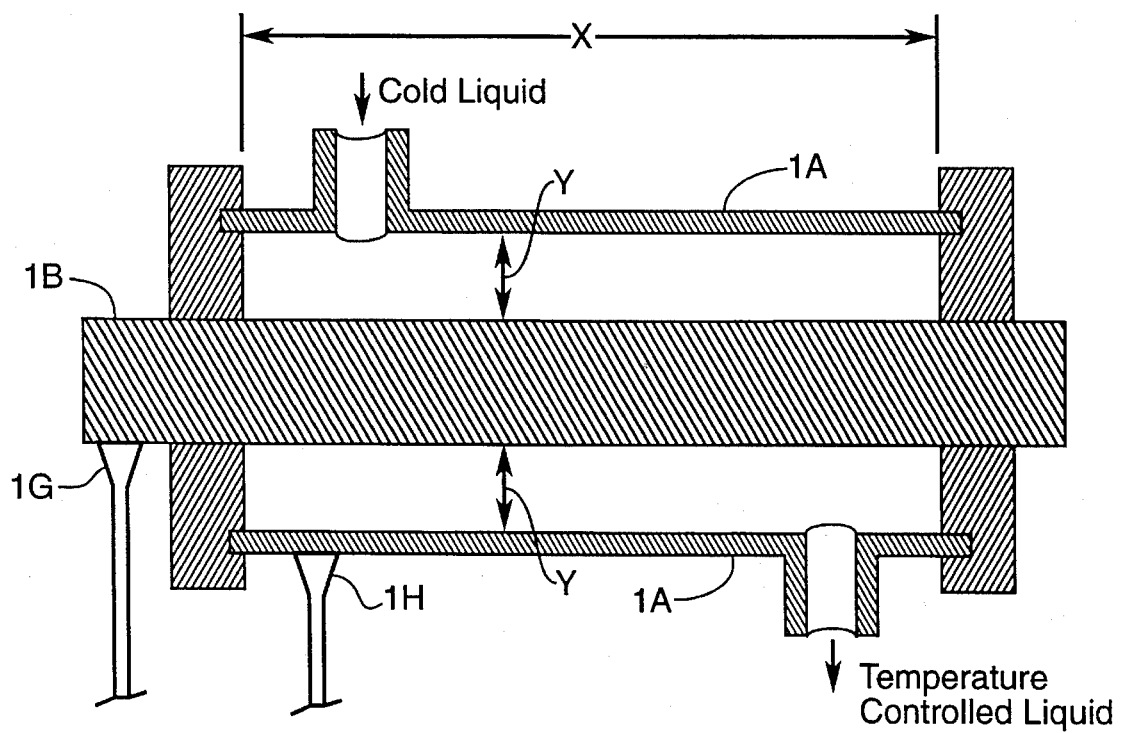
FIG. 5 is a plan schematic view of the heating chamber of the present invention.

As shown in FIGS. 1, 2 and 5, the present invention generally resides in a diathermal water heater with associated control circuitry. In diathermy, electrical oscillations and not the passage of current are used to generate heat.

FIG. 1 shows in a general schematic the present invention in one of its alternative embodiments. In the present invention, the heating chamber 1 is attached to a source of water. The electronic controller 2 is coupled to the heating chamber 1 and controls its operation as the heating chamber 1 heats the water passing through it. The electronic controller is connected to a source of power. Also connected to the electronic controller 2 are a flow sensor 3, a thermal sensor 4, and a valve 5.

The flow sensor 3 is preferably an electromechanical device that measures or regulates the flow of liquid through the heating chamber 1. Signals representing the flow of liquid through the heating chamber 1 is transmitted from the flow sensor 3 to the electronic controller 2. One such use for the information provided by the flow sensor 3 to the electronic controller 2 arises when the flow of liquid through the heating chamber suddenly ceases. When the flow sensor 3 detects the cessation of liquid flow through the heating chamber 1, the flow sensor 3 can indicate this condition to the electronic controller 2. The electronic controller 2 can then stop the heating chamber 1 from trying to heat absent liquid. Not all applications or embodiments of the present invention require the flow sensor 3.

The thermal sensor 4 is connected to the heating chamber 1 in such a way that the thermal sensor 4 detects and determines the thermal condition of the heating chamber 1 and its contents. The thermal sensor 4 transmits signals representing the thermal condition of the heating chamber 1 to the electronic controller 2 to provide feedback to the electronic controller 2 of the heating chamber 1 operation. If the signal from the thermal sensor 4 indicates to the electronic controller 2 that the temperature of the liquid in the heating chamber 1 is too low, the electronic controller can then respond by increasing the heating activity of the heating chamber 1. The temperature of the liquid then increases. Similarly, if the signal from the thermal sensor 4 indicates that the liquid temperature is too high, the electronic controller 2 can decrease the activity of the heating chamber 1 to lower the liquid temperature.

The valve 5 is connected to and controlled by the electronic controller 2. The valve 5 may be an electromechanical solenoid valve that can be used by the electronic controller 2 to control the flow of liquid through the heating chamber 1. Depending upon the application and embodiment of the present invention, signals provided to the electronic controller 2 by the flow sensor 3 can be used to regulate the flow of liquid through the heating tube 1 by regulation of the valve 5. If more liquid should flow, the electronic controller 2 can open the valve 5 wider to increase the flow (which would then be detected by the flow sensor 3). Should less liquid flow, the electronic controller 2 can close the valve 5 more to decrease the flow (also detected by the flow sensor 3). As with the thermal sensor 4, a feedback circuit is provided to the electronic controller 2 so that the flow of liquid through the heating chamber 1 can be regulated.

As shown in FIG. 5, the heating chamber 1 of the present invention has a pair of concentric stainless steel tubes 1A, 1B. The outer stainless steel tube 1A has openings on opposite sides so that liquid flowing through the heating chamber 1 must flow around the inner stainless steel tube 1B. The stainless steel tubes 1A, 1B are held in a spaced apart relation by a dielectric material 1C, 1D chosen and used according to the application for which the present invention is used. Such dielectric materials are contemplated as including ceramics and plastics. When put in use in the present invention, the dielectric material may be dish-shaped. The dielectric material physically and electrically isolates the outer stainless steel tube 1A from the inner stainless steel tube 1B by holding the inner stainless steel tube 1B at or near the center of stainless steel tube 1A.

Referring now to FIG. 2, both the heating chamber 1 and the electronic controller 2 are shown in schematic detail. The electronic controller 2 is connected to a source of power such as that provided by standard electrical outlets at 110 or 220 VAC. However, other voltages may be used including 330 and 440 VAC. The power source for the present invention is contemplated as corresponding to the specific needs of the application in which the present invention is used. Greater or lesser power sources may be required according to the embodiment of the present invention and according to the specific application.

A converter 2A initially receives the power from the power source. The converter 2A performs several power-related functions including providing the remaining circuitry within the electronic controller 2 with DC power through the power supply 2B. The converter 2A is connected to the power supply 2B, to the oscillator 2C and to the heating chamber 1. The converter 2A drives the heating chamber 1 with electrical oscillations at a frequency determined by the oscillator 2C. The electrical oscillations of the converter 2A are derived from a DC source such as the power supply 2B which are then converted into an AC signal. One lead connects the converter 2A to the outer stainless steel tube 1A of the heating chamber 1. A second lead connects the converter 2A to the inner stainless steel tube 1B.

A microprocessor 2D is used to control the operation of the electronic controller 2. The microprocessor 2D is connected to the oscillator 2C, the thermostat 2E, an EPROM memory or other source of programming 2F, and the flow sensor 3 and valve 5, if present. The thermostat 2E is also connected to the thermal sensor 4.

The microprocessor 2D orchestrates the operation of other electronic circuits in the controller 2 to control the operation of the heating chamber 1. Through the thermal sensor 4 and the thermostat 2E, the thermal performance of the heating chamber 1 is monitored by the microprocessor 2D. Control of the thermal operation of the heating chamber 1 by the microprocessor 2D is made through the oscillator 2C and the converter 2A. Through the flow sensor 3, the flow rate of the liquid is monitored by the microprocessor 2D. Control of the flow rate of liquid is made by through the valve 5. The specific application in which the present invention is used determines the operating parameters of the diathermal water heater. In order to flexibly and adjustably operate the present invention, the microprocessor 2D is made subject to programming specific to the application residing in the EPROM memory or other source of program instructions 2F.

The EPROM memory 2F controls the operation of the microprocessor 2D as it orchestrates the operation of the diathermal water heater of the present invention. A wide range of thermal and flow parameters may be required or encountered by the diathermal water heater of the present invention. It is through the EPROM memory 2F that the specific requirements of the application in which the present invention operates are anticipated, obtained, and maintained. Examples of different applications of the present invention are given in more detail below.

The operation of the diathermal water heater of the present invention is as follows. Initially, when there is no liquid flow through the heating chamber 1, no liquid flow is detected by the flow sensor 3 and microprocessor 2D prevents the oscillator 2C from providing the converter 2A with any frequency signal. Without a frequency signal from the oscillator 2C, the converter 2A does not drive the heating chamber 1 with electrical power oscillations. Without the electrical power oscillations from the converter 2A, the heating chamber 1 does not heat the liquid within and not heating of the liquid takes place. Generally, unless and until liquid flows through the heating chamber 1, no liquid heating takes place and the cold liquid stays at rest within the heating chamber 1.

Upon demand with its subsequent flow of liquid, the diathermal water heater of the present invention engages and immediately begins to heat the liquid flowing through it. When the flow sensor 3 detects the flow of liquid, it transmits signals to the microprocessor 2D indicating such liquid flow. With the flow of liquid, the microprocessor is directed by the instructions located in the EPROM memory 2F to determine if the liquid flowing through the heating chamber 1 requires additional heating. The microprocessor 2D checks the signals coming in to it from the thermostat 2E to determine if the flowing liquid requires heating. The thermostat 2E may be selectably controllable and can compare the signals coming in to it from the thermal sensor 4 to a preset signal indicating the temperature at which the flowing liquid should be kept. According to the results of this comparison, the thermostat 2E signals the microprocessor 2D.

Upon receiving the signals from the thermostat 2E, the microprocessor 2D instructs the oscillator 2C to oscillate or not to oscillate according to the instructions present in the EPROM memory 2F. If the microprocessor 2D instructs the oscillator 2C to oscillate, the microprocessor 2D also instructs the oscillator 2C at what frequency to oscillate according to the instructions of the EPROM memory 2F and with respect to the incoming signals from the thermostat 2E.

When the oscillator 2C is instructed by the microprocessor 2D to oscillate and at what frequency it should oscillate, the oscillator 2C commences to transmit an oscillating signal to the converter 2A. These signal oscillations may be of very low to very high frequency, from 15 to 1000 hertz or more. The converter 2A receives the oscillator 2C signal and converts the DC signal previously generated for power supply 2B back to AC with the selected frequency as received by the converter 2A from the oscillator 2C. The voltage at which the converter 2A drives the heating chamber 1 may be preselected according to the application or may be variably regulated according to user preferences or instructions present in the EPROM memory 2F.

The electrical oscillations generated by the converter 2A are transmitted to the heating chamber 1. These electrical oscillations are impressed upon the liquid flowing through the heating chamber 1 by the two concentric stainless steel tubes 1A, 1B. When the electrical oscillations are impressed upon the liquid within the heating chamber 1 by the stainless steel tubes, impurities such as the minerals that are dissolved in water (such as those ions making the water hard) are susceptible to these electrical oscillations and heat the liquid surrounding them. The liquid quickly warms and becomes hot according to the strength and frequency of the electrical oscillations.

The increased temperature of the liquid is detected by the thermal sensor 4, which transmits a temperature-indicating signal to the thermostat 2E. The thermostat 2E consequently signals the microprocessor 2D according to the signals from the thermal sensor 4.

Upon cessation of liquid flow, the heating chamber 1 returns to its dormant state to await the next demand for hot water.

One advantage of the present invention is that only one pipe is required for indoor plumbing to supply hot water for domestic purposes. Using a variable thermostat 2E, hot water of any temperature can be delivered from faucet to sink within approximately three seconds. The individual using the faucet can pre-select the temperature at which the water should flow and then commence the flow of water. Within five seconds, the temperature of the flowing water will be at the pre-selected temperature. The individual can then alter or adjust the water temperature according to preference. A savings in plumbing construction in new dwellings of over four thousand dollars can be realized when hot water pipes are not required in the plumbing of the dwelling. The lower energy requirements of an "instant on" water heater allow more prudent and efficient uses of natural resources, preserving the environment.

As the water heater of the present invention delivers hot water almost upon demand, there is no need to wait for the water first flowing through a hot water faucet to heat up before the water is ready to use. Running cooled water through a hot water tap can allow as much as four to eight gallons of water to run down the drain. With the present invention, such a waste of otherwise useable water is avoided. The radiative losses (10–15% for electric water heaters, 30–40% in gas water heaters) from the maintenance of hot water in tanks also allows the conservation of energy.

Another advantage of the present invention is that such a domestic water heater occupies a space similar in size to a twelve ounce beer can. With such a useful article embodied in such a small size, every sink, bathtub and shower in a house or other dwelling can have its own hot water heater that, for all intents and purposes, instantaneously heats the water to the desired temperature. In fact, a diathermal water heater according to the present invention can be reduced to such a size that it can be used in coffee machines with excellent results for the heating of water for coffee.

There are no moving parts in the present invention, allowing it to function well for a long period of time. Occasionally sediment may collect in the heating chamber 1. This sediment may be moved with a light brushing of the interior surfaces.

A steam cleaning wand can also be constructed implementing the present invention that uses boiling water and steam to clean surfaces such as concrete and the like.

At the industrial scale, the water heater of the present invention can be used on a massive scale with large amounts of electrical power to generate great quantities of hot water, wet steam and dry steam, as required by the application at hand.

Figure 3:
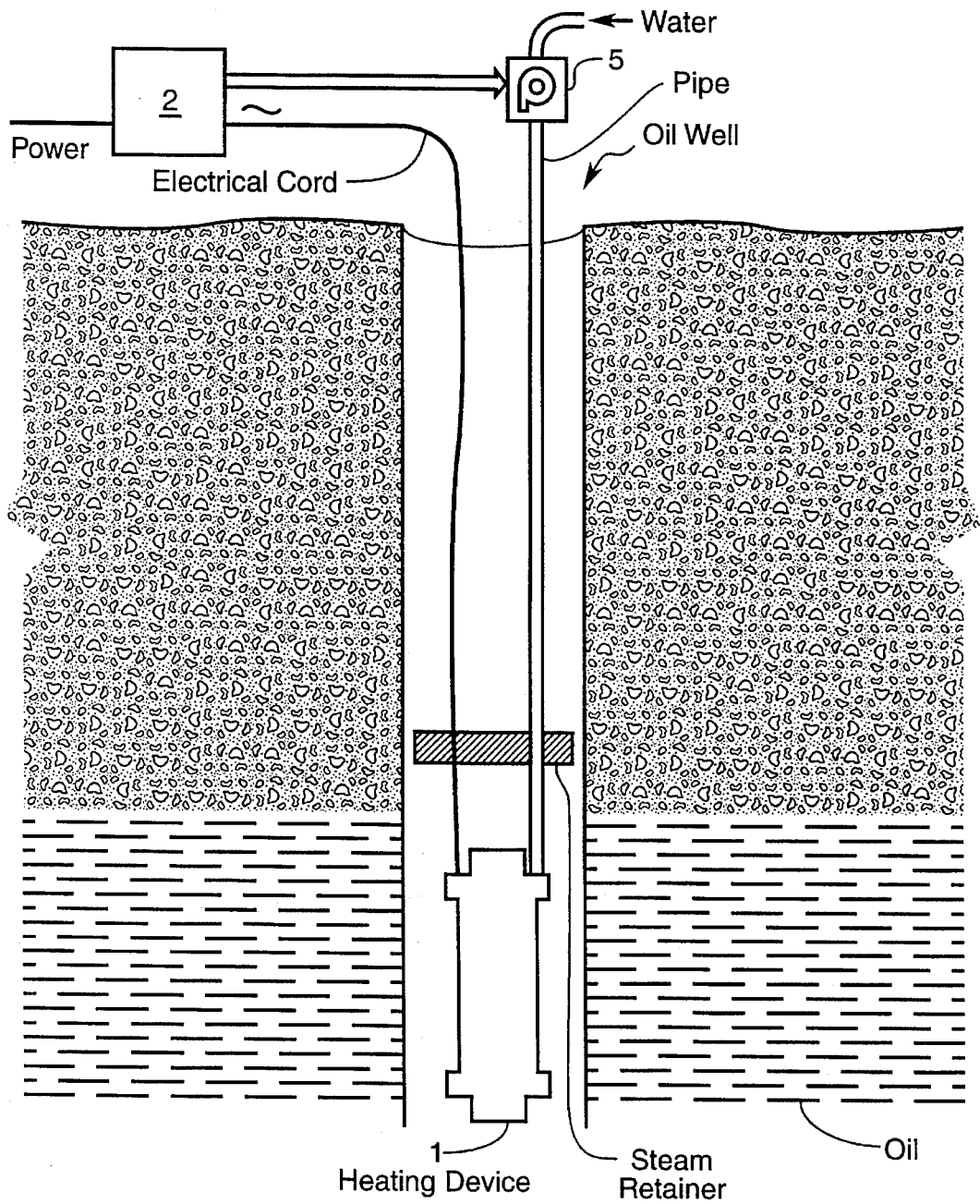
FIG. 3 is a plan schematic view showing the use of the present invention as used to generate downhole steam for oil recovery purposes.
Figure 4:
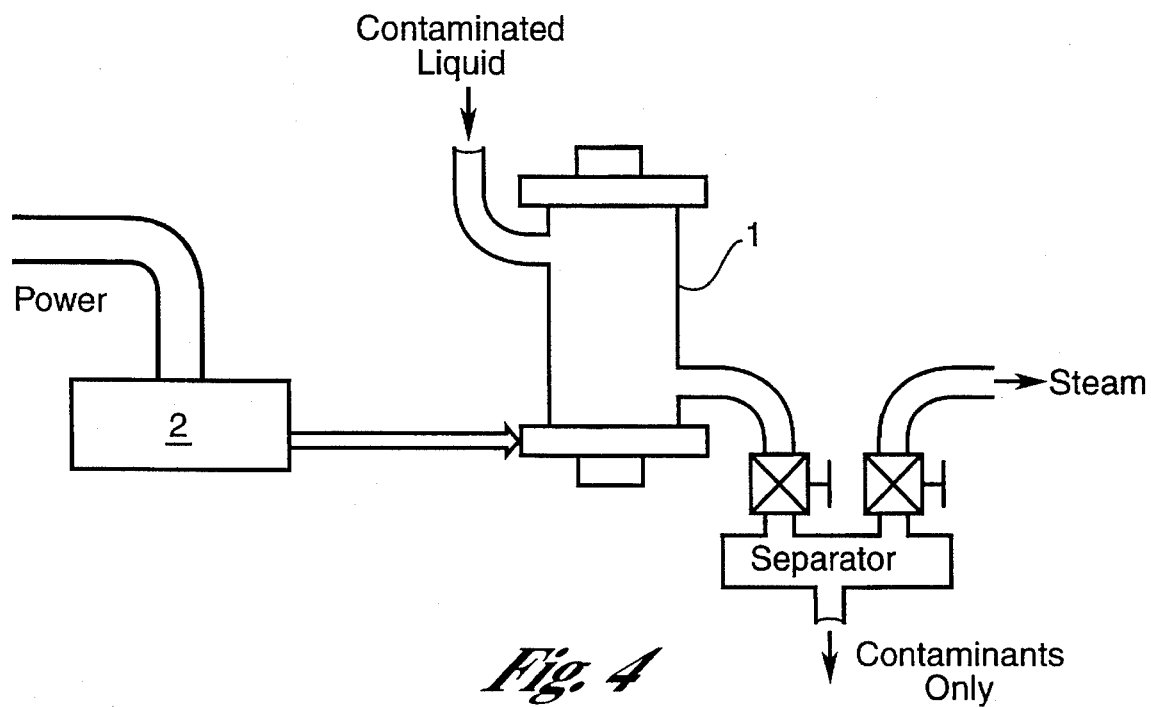
FIG. 4 is a plan schematic view showing the use of the present invention as used to recover water from a contaminated liquid.

As shown in FIGS. 3 and 4, the present invention can be implemented in the recovery of oil and in the recover of water from contaminated liquid.

In FIG. 3, the heating chamber 1 of the present invention is lowered downhole into an oil well. A steam retainer is used to prevent steam generated by the heating chamber from escaping back up the hole. The electronic controller 2 remains above ground. The valve 5 controls the flow of water to the heating chamber 1 and prevents excessive pressure from being exerted upon the heating chamber 1. The heating device 1 can be made in a compact manner to easily fit into the drilled hole. The steam generated by the heating chamber 1 can be used to warm the surrounding oil, allowing it to flow more easily through the rock strata for recovery.

In FIG. 4, a water recovery process is shown schematically. Contaminated liquid containing water is passed through the heating chamber 1. After the contaminated liquid is heated, it is passed through a separator that allows steam vapor to escape while allowing the more concentrated contaminated material to be collected separately. In this manner, cleaner water can be recovered from "grey water" or reclaimed water. Through a similar process, alcohol and/or ethylene glycol production, and oil dehydration may be performed.

While the present invention has been described with regards to particular embodiments, it is recognized that additional variations of the present invention may be devised without departing from the inventive concept.

What is claimed is:

1. A liquid heater, comprising:

a diathermal heating chamber;

control circuitry coupled to the diathermal heating chamber, the control circuitry controlling the operation of the diathermal heating chamber so that liquid heated by the diathermal heating chamber is delivered at a constant temperature, the control circuitry comprising an oscillator, the oscillator coupled to the diathermal heating chamber and transmitting a frequency controlling electrical oscillations to the diathermal heating chamber so that liquids within the diathermal heating chamber are heated;

a power converter, the power converter coupled to the diathermal heating chamber and the oscillator, the power converter transmitting electrical oscillations to the diathermal heating chamber at the same frequency as the signals transmitted by the oscillator, the power converter converting incoming AC electrical power to DC electrical power and DC electrical power to AC electrical power;

a power supply coupled to the power converter, the power supply supplying DC power to other circuit elements of the control circuitry;

a microprocessor coupled to the oscillator, the microprocessor controlling the frequency at which said oscillator oscillates and transmits;

an EPROM memory coupled to the microprocessor, the EPROM memory Storing instructions for the operation of the microprocessor a thermostat, the thermostat coupled to the microprocessor and transmitting signals indicating an operating temperature of the diathermal heating chamber; and a thermal sensor, the thermal sensor coupled to the diathermal heating chamber and to the thermostat, the thermal sensor sensing the operating temperature of the diathermal heating chamber and transmitting a signal representative of the operating temperature to the thermostat.

2. The liquid heater of claim 1, wherein the diathermal heating chamber further comprises:

a first and outer electrode; and a second and inner electrode, the liquid passing through the diathermal heating chamber passing between the first and second electrodes.

3. The liquid of claim 2, wherein the first and second electrodes are concentric stainless steel tubes with the second electrode located at or near the center of the first electrode.

4. The liquid heater of claim 1, further comprising:

a flow sensor coupled to the control circuitry, the flow sensor sensing flow of liquid through the diathermal heating chamber; and a valve coupled to the control circuitry, the valve controlling the flow of liquid through the diathermal heating chamber.

5. A liquid heater, comprising:

a diathermal heating chamber, comprising:
   a first and outer tube electrode of stainless steel; and
   a second and inner tube electrode of stainless steel concentric with the first electrode at or near the center of the first electrode, the liquid passing through the diathermal heating chamber passing between the first and second electrodes; and control circuitry coupled to the diathermal heating chamber, comprising:
   an oscillator, the oscillator coupled to the diathermal heating chamber and transmitting a frequency controlling electrical oscillations to the diathermal heating chamber so that liquids within the diathermal heating chamber are heated;

a power converter, the power converter coupled to the diathermal heating chamber and the oscillator, the power converter transmitting electrical oscillations to the diathermal heating chamber at the same frequency as the signals transmitted by the oscillator, the power converter converting incoming AC electrical power to DC electrical power and DC electrical power to AC electrical power;
   a power supply coupled to the power converter, the power supply supplying DC power to other circuit elements of the control circuitry;

a microprocessor coupled to the oscillator, the microprocessor controlling the frequency at which said oscillator oscillates and transmits;
   an EPROM memory coupled to the microprocessor, the EPROM memory storing instructions for the operation of the microprocessor;
   a thermostat, the thermostat coupled to the microprocessor and transmitting signals indicating an operating temperature of the diathermal heating chamber; and
   a thermal sensor, the thermal sensor coupled to the diathermal heating chamber and to the thermostat, the thermal sensor sensing the operating temperature of the diathermal heating chamber and transmitting a signal representative of the operating temperature to the thermostat;

the control circuitry controlling the operation of the diathermal heating chamber so that liquid heated by the diathermal heating chamber is delivered at a constant temperature.

6. The liquid heater of claim 5, further comprising:

a flow sensor coupled to the control circuitry, the flow sensor sensing flow of liquid through the diathermal heating chamber; and a valve coupled to the control circuitry, the valve controlling the flow of liquid through the diathermal heating chamber.

\* \* \* \* \*